Figure 3:
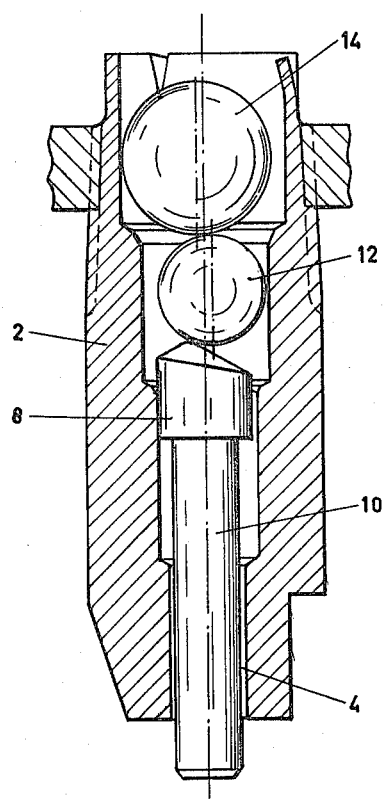

United States Patent
Spierenburg

[15] 3,669,077
[45] June 13, 1972

[54] DRINKING NIPPLE FOR POULTRY

[72] Inventor: Gozen Spierenburg, Hilversum, Netherlands

[73] Assignee: N.V. Gereedschappenfabriek Spierenburg, Loosdrecht, Netherlands

[22] Filed: June 30, 1970

[21] Appl. No.: 51,044

[30] Foreign Application Priority Data

July 1, 1969 Netherlands..........................6910036

[52] U.S. Cl. ........................................119/72.5, 137/630.22
[51] Int. Cl. ......................A01k 7/02, F16k 1/06, F16k 1/44
[58] Field of Search...............................119/72.5; 137/630.22

[56] References Cited

UNITED STATES PATENTS

| | | |
|---|---|---|
| 3,513,811 | 5/1970 | Graham..................................119/72.5 |
| 796,392 | 8/1905 | Bailey..................................137/630.22 |
| 2,475,739 | 7/1949 | Frank.........................................103/179 |
| 2,851,007 | 9/1958 | Kagan........................................119/72.5 |
| 3,537,430 | 11/1970 | Peppler......................................119/72.5 |

Primary Examiner—Aldrich F. Medbery
Attorney—Karl W. Flocks

[57] ABSTRACT

A drinking nipple for poultry comprising a housing having two ball valves of different diameter arranged one above the other on their seats, a tappet being located in the lower end of said housing, said tappet having a head co-operating with the lowermost ball valve and a stem projecting from said housing, the distance between the two balls being such that the tappet when being raised first lifts the first ball from its seat and upon further movement of said tappet the first ball lifts the second ball from its seat.

5 Claims, 5 Drawing Figures

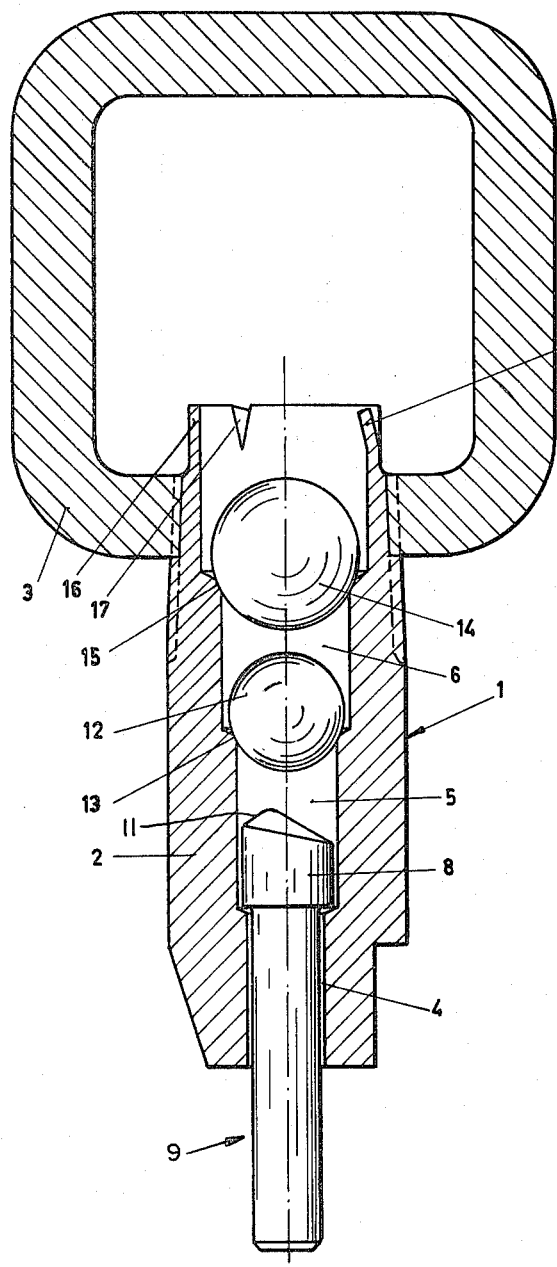
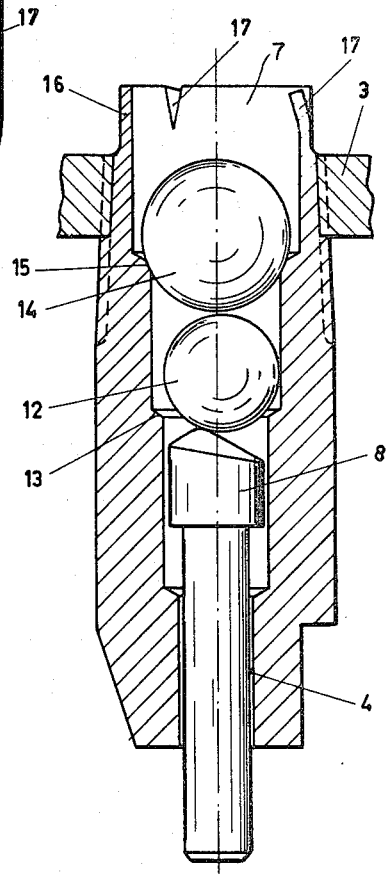
FIG.1
FIG.2

DRINKING NIPPLE FOR POULTRY

This invention relates to a drinking nipple for poultry, with the aid of which poultry are able to drink without polluting the drinking water, said drinking nipple being actuated by the poultry with their bills if they want to drink.

The drinking nipple according to the invention is characterized in that it comprises a housing adapted to be mounted in a water source, such as a water reservoir, a water pipe and the like, and having an axial bore with three successive parts of different diameter, there being provided in the first, lowermost part of the smallest diameter a tappet comprising a head and a stem projecting through a hole in the housing from said housing, in the following second bore part of larger diameter a spherical segment-shaped seat and a first ball resting thereon, the third, uppermost part having the largest diameter, said uppermost part comprising a spherical segment-shaped seat and a second ball resting thereon of a larger diameter than the first ball, the distance between the head of the tappet and the first ball and the distance between the two balls being such that the tappet when being raised first lifts the first ball from its seat and upon further movement of said tappet the first ball lifts the second ball from its seat. When the poultry want to drink they push with their bills against the tappet stem projecting from the housing so that said stem is moved upwards and lifts the first ball from its seat. The water located between the two balls then flows from the drinking nipple into their bill. If the poultry want to drink more they push the stem of the tappet further upwards so that the first ball lifts the second ball from its seat and water from the water reservoir or water line flows out of the nipple. As soon as the pressure exercised on the stem of the tappet ceases, the tappet moves downwards and the balls return to their seats thus closing the supply of water.

A preferred embodiment of the drinking nipple according to the invention is characterized in that the head of the tappet comprises an inclined upper surface located on either side of the center line of the bore, which co-operates with the first ball. Consequently, when the tappet is moved upwards it will impart to the ball on top of the tappet a rolling movement, while said ball imparts to the second ball a rolling movement in the opposite sense. When the tappet moves downwards again the balls roll in the opposite sense consequently rubbing past their seats so that they clean these seats and themselves if dirt has accumulated on said balls or their seats.

In order to prevent the balls and the tappet from dropping out of the housing the upper end of the housing may comprise, according to the invention, one or more inwardly projecting stops. Moreover, this offers the possibility of mounting the drinking nipples in the bottom of a reservoir or in a pipe line, after reversal of said reservoir or pipe line, from above which may be rapidly and easily done.

Since poultry have a way of pecking at red, according to the invention the tappet may comprise a red stem. It is preferred to manufacture said tappet from red anodized aluminum.

The invention will be further explained below with reference to the accompanying drawings showing by way of example an embodiment of a drinking nipple according to the invention.

Figure 4:
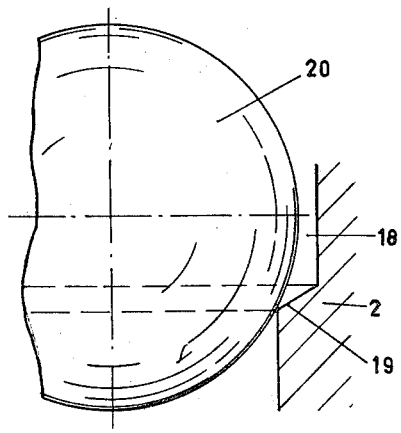
Figure 5:
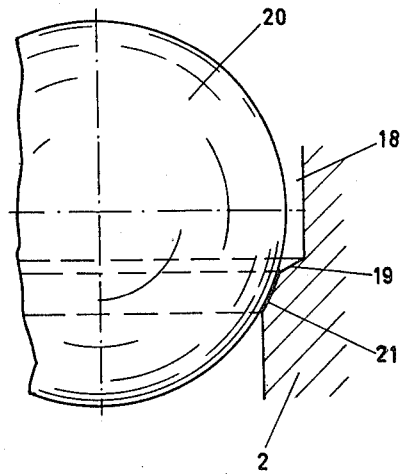

These drawings show in:

FIG. 1 this drinking nipple mounted in a pipe line, partly in longitudinal section and partly in elevation;

FIG. 2 the position of the tappet and of the first ball when said first ball has been lifted from its seat, FIg. 3 the position of the tappet and of the two balls which both have lifted from their seat, FIG. 4 on an enlarged scale part of a ball resting on part of a drilled seat, and FIG. 5 part of the ball with the aid of which its seat has been formed.

The drinking nipple 1 shown in the drawings comprises a housing 2 which by means of external thread is mounted in a hole having an internal thread of a pipe 3 of square cross section. If desired the drinking nipple could be constructed such that it could be pressed by snap action into a hole of said pipe 3. The pipe 3 is connected in a manner not shown with a water reservoir, water line or some other source for supplying water under pressure. The feeding pressure of the water is such that upon the drinking nipple being pushed open the water flows only slowly out of the nipple. Usually a water head of 20–30 cm. will suffice. In order to keep this pressure as low as possible steps are taken for pipe lines, to which a large number of nipples are connected, to be provided with nipples which project as little as possible in the pipe line 3.

The housing 2 of the drinking nipple 1 may be manufactured from any desired material, for example synthetic material, rubber or metal. If the housing consists of metal it is preferably manufactured from stainless steel.

In the housing 2 there is a bore which through a part 4 is in communication with the atmosphere and which comprises three co-axial parts 5, 6 and 7. In the lowermost part 5 of said three co-axial bore parts there is located with clearance the head 8 of a tappet 9, the stem 10 of said tappet projecting at the lower side of the housing 2 also with clearance through the bore part 4 from said housing. The head 8 of the tappet 9 comprises an inclined upper surface 11 extending on either side of the center line of the bore 4, 5, 6, 7 to define an eccentric apex for imparting a rolling motion to a valve ball 12.

In the bore part 6 following on the bore part 5, which has a somewhat larger diameter than the bore part 5, there is located a ball 12 supported by a seat 13, and in the following part 7 there is located a ball 14 supported by a seat 15. These balls may consist of precision-made balls of hard steel.

In the upper end 16 of the housing 2 incisions have been made so that parts thereof forming stops 17 can be pressed inwards. Thus the walls 12 and 14 and the tappet 9 are prevented from dropping out of the housing 2.

The above-described drinking nipple 1 operates as follows:

When a chicken, a duck or some other animal pushes with its bill against the stem 10 of the tappet 9, said tappet is raised and lifts the ball 12 (FIG. 2). The water held between the ball 12 and the ball 14 then flows along the stem 10 into the animal's bill. When the animal withdraws its bill the tappet 9 drops downwards and the ball 12 drops onto its seat 13 thus preventing a further outflow of water. When the animal wants to drink more it pushes with its bill the tappet 9 further upwards so that the ball 12 comes into contact with the ball 14 lifting the latter from its seat (FIG. 3). As a result result water contained in the pipe line 3 can flow out of the drinking nipple until the animal withdraws its bill. The tappet 9 and the balls 12 and 14 then return to the position shown in FIG. 1 so that no water can flow anymore from the drinking nipple 1 and the space between the balls 12 and 14 is filled with water.

As shown in FIGS. 1–3, the upper surface 11 is eccentrically inclined relative to the center line of the bore 4, 5, 6, 7, to form an apex. The ball 12, when being lifted by the inclined surface of tappet 9 (FIG. 2), will roll towards the right and will come into contact with the inner wall of the bore part 7. The tappet 9 is thereby pressed towards the left against the wall of the bore part 4 so that the water can easily flow out of the nipple. If the tappet 9 is lifted farther the ball 12 will lift the ball 14 from its seat (FIG. 3), said ball 14 rolling to the left. When the balls move back to their seats they also carry out a rolling movement which results in a cleaning of the balls and seats.

FIGS. 4 and 5 serve to illustrate the method for the manufacture of spherical segment-shaped seats for the balls. FIG. 4 shows part of the nipple housing 2 in which by means of a drill a bore 18 with an annular inclined surface 19 corresponding with the point of the drill has been drilled. In said bore 18 a ball 20 is placed. Said ball rests on the inner edge of said inclined surface 19. By lightly and repeatedly hitting said ball 20 or by vibrating, pressing or moving the ball 20 downwards in a similar way a spherical segment-shaped seat 21 for said ball is formed in which the ball accurately and sealingly fits.

It is obvious that the invention is not restricted to the embodiments described above and shown in the drawings and to the method described in the specification and illustrated in the drawings respectively, but that these may be modified in many ways without departing from the scope of the invention as laid down in the claims. If desired the drinking nipples may be constructed such that their upper surfaces, after mounting in a pipe wall, are flush with the inner surface of said pipe wall thus further reducing the flow resistance.

I claim

1. A drinking nipple for poultry comprising a housing adapted to be mounted in a water source, such as a water reservoir, a water pipe and the like, and having an axial bore with three successive parts of different diameter, there being provided in the first, lowermost part of the smallest diameter a tappet comprising a head and a stem projecting through a hole in the housing from said housing, in the following second bore part of larger diameter a spherical segment-shaped seat and a first ball resting thereon, the third, uppermost part having the largest diameter, said uppermost part comprising a spherical segment-shaped seat and a second ball resting thereon of a larger diameter than the first ball, the distance between the head of the tappet and the first ball and the distance between the two balls being such that the tappet when being raised first lifts the first ball from its seat, the tappet including an eccentric apex means for imparting a rolling motion to the first ball in lifting it, and upon further movement of said tappet the first ball lifts the second ball from its seat and imparting to the second ball a rolling motion.

2. A drinking nipple according to claim 1, characterized in that the head of the tappet comprises an inclined upper surface located up either side of the center line of the bore, which constitutes said means and co-operates with the first ball to produce a lateral shift of the tappet and provide an enlarged water passageway in the bore.

3. A drinking nipple according to claim 1, characterized in that its upper end comprises at least one inwardly projecting stop preventing the uppermost ball from dropping out of its bore.

4. A drinking nipple according to claim 1, characterized in that the tappet comprises a red stem which preferably is made from red anodized aluminum.

5. A drinking nipple for poultry comprising a housing adapted to be mounted in a water source such as a water reservoir, a water pipe and the like, and having an axial bore with three successive parts of different diameter, there being provided in the first, lowermost part of the smallest diameter a tappet comprising a head and a red stem projecting through a hole in the housing from said housing, the head of the tappet having an eccentrically inclined surface defining an apex cooperating with the first ball, in the following second bore part of larger diameter a spherical segment-shaped seat and a first ball resting thereon, the third, uppermost part having the largest diameter, said uppermost part having the largest diameter, said uppermost part comprising a spherical segment-shaped seat and a second ball resting thereon of a larger diameter then the first ball, the distance between the head of the tappet and the first ball and the distance between the two balls being such that the tappet, when being raised lifts the first ball from its seat with a rolling motion imparted to the first ball, and upon further movement of said tappet the first ball lifts the second ball from its seat with a rolling motion imparted to the second ball, the upper end of the housing being provided with at least one inwardly projecting stop preventing the second ball from dropping out of its seat.

* * * * *